US010212408B1

United States Patent
Pappas-Katsiafas et al.

(10) Patent No.: US 10,212,408 B1
(45) Date of Patent: *Feb. 19, 2019

(54) DEPTH-MAP AUGMENTATION TECHNIQUES

(71) Applicant: Amazon Technologies, Inc., Seattle, WA (US)

(72) Inventors: Evangelos Pappas-Katsiafas, Cambridge (GB); Ilya Vladimirovich Brailovskiy, Mountain View, CA (US); Naushirwan N Patuck, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/196,721

(22) Filed: Jun. 29, 2016

(51) Int. Cl.
| H04N 13/128 | (2018.01) |
| H04N 13/254 | (2018.01) |
| H04N 13/271 | (2018.01) |
| H04N 13/25 | (2018.01) |
| G06T 7/00 | (2017.01) |
| G06T 19/20 | (2011.01) |

(52) U.S. Cl.
CPC .......... *H04N 13/128* (2018.05); *G06T 7/004* (2013.01); *G06T 7/0057* (2013.01); *G06T 7/0075* (2013.01); *G06T 7/0081* (2013.01); *H04N 13/25* (2018.05); *H04N 13/254* (2018.05); *H04N 13/271* (2018.05); *G06T 2207/10024* (2013.01); *G06T 2207/10028* (2013.01)

(58) Field of Classification Search
CPC ............. H04N 13/0022; H04N 13/025; H04N 13/0253; H04N 13/0271; G06T 7/004; G06T 7/0057; G06T 7/0075; G06T 7/0081
USPC ......................................................... 348/47
See application file for complete search history.

(56) References Cited

U.S. PATENT DOCUMENTS

| 8,213,737 | B2 | 7/2012 | Steinberg et al. |
| 9,066,087 | B2* | 6/2015 | Shpunt .................. G01B 11/25 |
| 9,569,819 | B2 | 2/2017 | Lai et al. |
| 2005/0084156 | A1 | 4/2005 | Das et al. |
| 2009/0167930 | A1 | 7/2009 | Safaee-Rad et al. |

(Continued)

OTHER PUBLICATIONS

Office Action for U.S. Appl. No. 15/196,628, dated Jan. 26, 2018, Brailovskiy, "Depth-Map Augmentation Techniques", 15 pages.

*Primary Examiner* — Hee-Yong Kim
(74) *Attorney, Agent, or Firm* — Lee & Hayes, P.C.

(57) ABSTRACT

The techniques described herein segment objects represented in images using one or more depth maps, regardless of whether an initial depth map is of a threshold quality. To do so, the techniques contemporaneously generate, by a depth sensor, a depth map of an environment and capture, by an RGB camera, a color image of the environment. The techniques then determine whether the initial depth map is of the threshold quality. If so, the techniques use this depth map for performing segmentation on an image. If not, then the techniques generate a new depth in part by comparing an image captured by the depth sensor to the color image and performing block-matching between these images. That is, the techniques use the depth sensor and the RGB camera as stereo pair and fill in holes of the initial depth map based on the block-matching.

20 Claims, 6 Drawing Sheets

(56) References Cited

U.S. PATENT DOCUMENTS

2009/0324059 A1  12/2009  Boughorbel
2011/0025827 A1* 2/2011  Shpunt ............... H04N 13/0239
                                              348/47

* cited by examiner

DEPTH-MAP AUGMENTATION TECHNIQUES

BACKGROUND

Electronic devices are ubiquitous in today's society. People use tablet computing devices, mobile phones, electronic book readers, laptop computers, and the like for an array of recreational and/or work-related activities. For instance, users often use electronic devices to capture images and videos of users and other scenes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
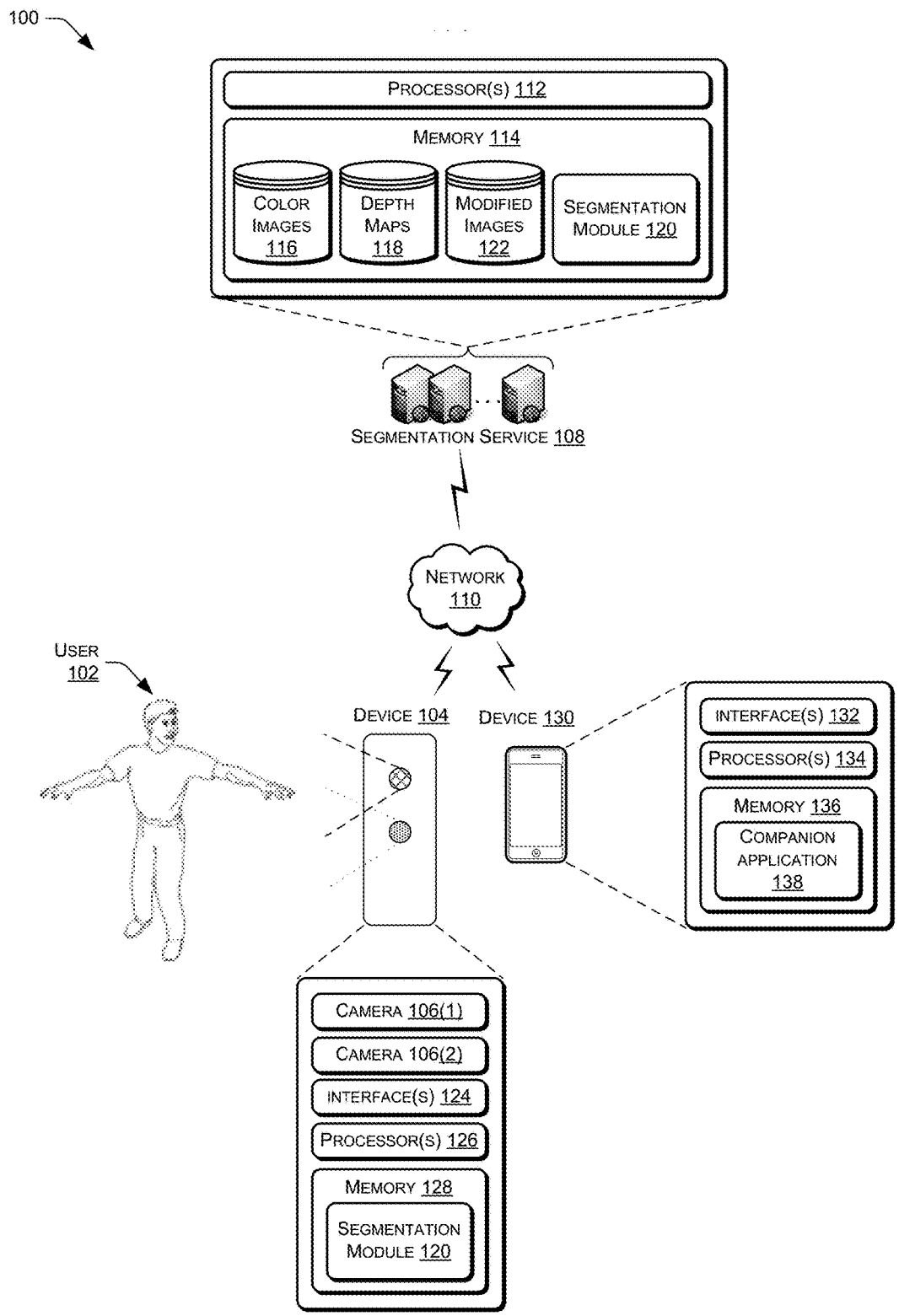
FIG. 1 illustrates an example environment that includes a user requesting that a segmentation service create an image of the user wearing a particular item of clothing based on an image of the user captured by a device within the user's environment. To create this new image, the segmentation service may utilize both a depth map generated by the local device and a color image acquired by the local device. However, if a quality of the depth map does not meet a threshold quality, then the segmentation service may utilize a fallback process for performing the segmentation on the color image prior to the creation of the new, requested image.

This application describes techniques for segmenting objects represented in images using one or more depth maps, regardless of whether an initial depth map is of a threshold quality. As described below, a device may include one or more cameras which may capture one or more images of an environment. In some instances, the device or another device (e.g., a remote server) may generate a depth map of the environment based on captured images and may use this depth map to identify an object of interest therein. For example, the device may generate a depth map, which may be used to identify a user (or other object of interest) within the depth map. After identifying the user or other object of interest, the device or another device may segment that object from an image, such as a black-and-white, sepia, grayscale, or color image captured by the device at a time corresponding to a time when the depth map was generated. That is, the device or the other device may assign a first label (e.g., "user", "object of interest", etc.) to the pixels having respective locations corresponding to the user or the object of interest, while assigning a second label to other pixels (e.g., "background"). In some instances, the device or another device may then perform additional processes using the segmented image, such as generating a new, modified image, performing image analysis on the segmented portion of the image, or the like. It is noted that as used herein, a "pixel" may refer to a particular portion of an image or depth map and, therefore, includes both a location in the image/depth map or a value. For instance, a pixel of a depth map may include an (X,Y) location within the depth map, as well as a depth (or "Z") value. A pixel of a visible (e.g., color) image, meanwhile, may include an (X,Y) location, as well as a color value (e.g., expressed in RGB terms or the like). A physical pixel, meanwhile, may refer to a physical component of a sensor, such as a physical component of a depth camera, an RGB camera, or the like, that generates the above-mentioned pixel value information (e.g., depth or color value) by transforming light or another analog signal into a digital representation.

In one specific example, a device in a user environment includes a first camera configured to generate a depth map of the environment, and a second camera to generate still images and/or video of the environment (e.g., one or more color images). Upon receiving an instruction to do so, the device may generate, substantially contemporaneously, a depth map of the environment and a color image of the environment while a user stands in front of both cameras. The device may generate the depth map in any number of ways. For instance, the device may include a projector that projects structured light onto objects within the environment. When the objects receive the light, the topography of the objects effectively "deform" or "distort" the light from the known pattern at which they were emitted. The depth camera then captures one or more images of the environment while the projector projects the structured light, and the device or another device utilizes computer-vision techniques to determine the depth of the objects within the environment based on the distortion. The generated depth map may express a depth of each pixel as a value between the physical pixel of the depth camera corresponding to the pixel and a nearest object in the environment along a logical line extending orthogonally from the respective physical pixel. In some instances, the depth camera is unable to assign depth values to each pixel represented by the depth map. For instances, due to high reflectance, low reflectance, an abundance of ambient light, a lack of light, or the like, the depth camera may be unable to assign to a pixel (or multiple pixels) a depth value that is above a predefined threshold confidence level. Therefore, certain pixels of the depth map may have unknown depth values, and may be referred to as "holes" in the depth map. As used herein, a pixel may be labeled as lacking a depth value based on a corresponding depth value at that pixel being associated with a depth value that is not above a minimum confidence level. That is, the pixel may be considered to lack a depth value based on the depth value assigned by the depth value being associated with a small confidence value.

After generating the depth map and acquiring the color image, the device may then send the depth map and the color image to a segmentation service for segmenting the portion of the color image corresponding to the user or other object of interest in the image. The segmentation service may reside at the device, on another device within the environment, or remote from the environment.

Upon receiving the depth map and the color image, the segmentation service may initially apply one or more denoising (or "noise-reduction") algorithms to the depth map in an attempt to "fill the holes" of the depth map by assigning depth values to the pixels that do not include depth values specified by the depth map (or depth values that are greater than a certain confidence level). For example, the segmentation service may apply linear smoothing filters, non-linear smoothing filters, anisotropic diffusion, non-local means, or other techniques for removing "noise" in the form of missing or low-confidence depth values from the depth map. In some of these instances, the pixels lacking depth values may be treated as speckle noise and, generally, may be assigned depth values based on the depth values of neighboring pixels.

In other instances, the segmentation service may apply temporal noise-reduction algorithms. For example, envision that the device in the user environment periodically, sporadically, or continuously generates depth images of the environment. To assign a pixel value to a pixel lacking a depth value within the depth map, the service may determine the value of the missing pixel in one or more previous depth maps generated by the camera. That is, in instances where the camera generates depth maps of the environment from a fixed location, a temporal noise-reduction algorithm may determine a depth value for a particular pixel of a depth map based one or more previous depth values of that pixel in previously generated depth maps. In some instances, the device may assign the depth value most recently assigned to that pixel, may apply an average or median depth value assigned to that pixel over a number of previously generated depth maps, or the like. Further, while the above example describes applying temporal noise-reduction algorithms prior to determining whether the depth map is of sufficient quality, in some instances these algorithms may additionally or alternatively be applied as a fallback solution, in addition or in the alternative the example fallback solutions discussed with reference to FIGS. 3-9.

After applying one or more noise-reduction algorithms to the depth map, the segmentation service may determine whether the depth map is of sufficient quality for use in segmenting the image. In some instances, the segmentation service may make this determination with reference to an entirety of the depth map, while in other instances it may do so with reference to a particular region-of-interest (ROI). For instance, the segmentation service may initially define an ROI corresponding to some or all of the object of interest and may make the quality determination with respect to this ROI. In one example, the segmentation service may define an ROI that substantially corresponds to a body of the user (e.g., an entirety of the user, a torso of the user, torso/legs/arms of the user, etc.). For instance, the segmentation service may attempt to identify a predefined part of the user and may then define the ROI based on the location of the predefined part. In one example, the segmentation service uses facial-recognition techniques to identify, from the depth map or the color image, a face of a user depicted in the depth map and/or image. The segmentation service may then define an ROI corresponding to less than all of the depth map and image and having a location that is based on the location of the face of the user. In one example, the ROI comprises a rectangular section of the depth map or image located beneath the location of the face. Of course, in other examples, the segmentation service may define the ROI with reference to any other predefined part of the user (e.g., hands, torso, legs, etc.) and the ROI may have any other form (e.g., oval-shaped, polygonal, custom-shaped, etc.). It is also noted that while the above description describes applying one or more noise-reduction algorithms to the depth map prior to defining the ROI, in other instances these algorithms may additionally or alternatively be applied after defining the ROI.

After defining the ROI, the segmentation service may then determine whether the ROI of the depth map is greater or less than a threshold quality. For instance, the segmentation service may determine an amount of pixels of the ROI that lack depth values having a minimum confidence level and may compare this to a threshold amount. If the number of pixels lacking depth values having the minimum confidence level is greater than the threshold amount, then the segmentation service may deem the depth map unsuitable for use and may utilize one or more fallback methods as described below. If, however, the amount of pixels is not greater than this threshold amount, then the segmentation service may utilize this depth map for segmentation, also as described below. In some instances, the comparison may be based on a raw number of pixels lacking depth values having the minimum confidence level, while in other instances the comparison may be made based on a percentage of pixels of the ROI lacking depth values having the minimum confidence level or based on other comparison techniques. For instance, the segmentation service may deem a depth map unsuitable for use if 5%, 10%, 30%, 50%, or the like of the pixels of the ROI lack depth values.

If the segmentation service determines that the depth map is of sufficient quality, then the service may segment the object of interest, such as the depiction of the user, from the color image. That is, the segmentation service may utilize the depth map to determine the pixels corresponding to the depiction of the user and may assign these pixels a first label, and may determine the remaining pixels of the image and may assign these a second label. Generally, the first label may indicate that the respective pixels assigned this label correspond to the object of interest, while the second label may indicate that these respective pixels correspond to the background. After doing so, the segmentation service or another entity may perform additional functions on the color image, such as generate a new image based in part on the depiction of the object of interest in the color image. In one example, the segmentation service uses the segmented image and another image of a particular piece of clothing to generate a new image that illustrates how that particular piece of clothing would look if worn by the user in the segmented image. The segmentation service may then provide this to a device for output on a device of the user.

If, however, the segmentation service determines that the depth map is not of sufficient quality, then the segmentation service may utilize one or more fallback approaches to generate a second depth map for segmentation. In one such instance, the segmentation service analyzes pixels of the original depth map having respective depth values to identify a known part of the user, such as a torso, an arm, a hand, legs, a face, or the like. The segmentation service then uses this location coupled with known information regarding the shape of a human body to estimate a most likely location of a remaining part of the user. The segmentation service then assigns depth values that match or are substantially similar to the depth values of the pixels of the known part of the user to the pixels in the estimated location. In some instances, the segmentation service may utilize a human skeletal model to make this determination. When using a model of an average human body in this manner, the segmentation service may map the model onto the known parts of the user within the depth map to identify additional locations of the depth map that also likely correspond to the user. The segmentation service may then assign depth values to the pixels, with these values being based on the depth values of the depth map associated with the known parts of the user.

In the instances where the segmentation service utilizes a skeletal model to estimate portions of the depth map that correspond to a user, the segmentation service may also analyze previously generated depth maps to assist in this estimation. To provide an example, the segmentation service may determine from previous depth maps (and/or still images or video) that the user within the environment is moving from left to right from the perspective of the camera. The segmentation service may take this into account when estimating the location of the user within the current depth map by shifting the estimated location further to the right than the location of the user in the immediately preceding depth map.

In other instances, the segmentation service may directly utilize depth values from previously generated depth maps to fill holes within a current depth map. For instance, the segmentation service may compare an image captured at a time corresponding to the current depth map to previously captured images. In response to identifying a particular color image having a similarity to the color image that is greater than a similarity threshold, then service may acquire the depth map corresponding to this previous image. The segmentation service may then assign, to pixels of the current depth map lacking depth values, depth values associated with the respective pixels in the previously generated depth map. This method may result in a relatively accurate estimate of the user or other object of interest in the current depth map due to the high degree of similarity of the location of the user or other object of interest in the current image and the previously acquired image.

In still other instances, the segmentation service may estimate additional depth values of the object of interest within the current depth map based at least in part on stereoscopic techniques. As described above, the device in the user environment may include the first camera configured to generate the depth map and the second camera configured to generate the still images and/or video. In these instances, the device and/or the segmentation service may store an indication of a distance (i.e., an offset or offset distance) between these two cameras. As such, when the quality of the generated depth map is less than the quality threshold, the segmentation service may regenerate a new depth map using at least an image captured by the first camera (i.e., an image used to generate the original depth map or a subsequent image), an image captured by the second camera at substantially the same time as the image captured by the first camera, and the known offset between the first camera and the second camera. To create the depth map in this manner, the segmentation service may apply a block-matching algorithm to the two images to align these images. After aligning the images, the segmentation service may determine depth values of the objects within the images using the stereo pair of images and the known offset between the cameras.

In still another example, when the quality of the depth map is less than the quality threshold, a second depth map may be generated based on the device in the user environment engaging in a focus sweep. To do so, a camera of the device may capture multiple images of the environment from a static position, with a lens of the camera having different focal lengths during each capture. For instance, in one example the camera may capture a first image of the environment while the lens of the camera is at a first focal length. The device, the segmentation service, or another entity may then assign a respective sharpness score to each pixel of the first image. Next, the camera may capture a second image of the environment while the lens of the camera is at a second focal length that is greater than the first focal length. The device, the segmentation service, or another entity may then assign a respective sharpness score to each pixel of the second image. Thereafter, the camera may capture a third image of the environment while the lens of the camera is at a third focal length that is greater than the second focal length. The device, the segmentation service, or another entity may then assign a respective sharpness score to each pixel of the third image. After capturing these three images (or any other number of images), the device, the segmentation service, or another entity may generate a depth map based at least in part on the collective sharpness scores. For example, when a particular pixel has a relatively high sharpness score, the pixel may be determined be in focus. The focal length of the lens used during the capture of that respective image may then be used to approximate and assign a depth value to that pixel. In some instances, the device or service may interpolate these depth values based on the sharpness scores of the pixel across multiple images.

In either instance, the depth map may be generated based on assignment of depth values to each pixel using the sharpness scores.

In still another example, when the depth map is deemed unsuitable for use, the segmentation service or another entity may generate a new depth map based on the identification of a background within the environment over time. That is, in instances where the device resides in a fixed position within the user environment over time, the device may generate multiple depth maps and/or acquire multiple images over time. These depth maps and/or images may be used to identify the portions of the environment that remain fixed. That is, while certain objects, such as humans, animals, and the like, may periodically appear within the depth maps and images and at different positions, other objects, such as walls, furniture, and the like, may appear consistently and in static positions. The segmentation service may then label pixels corresponding to these static, fixed objects as background. Therefore, the segmentation service or other entity may identify an object of interest within a particular depth by subtracting the known background. That is, the segmentation service may deem those pixels of the depth map that are not labeled as background as pixels corresponding to the object of interest.

Finally, in another example the device may recapture images for re-generating a depth map when the current depth map is below the threshold quality. For instance, if the device or the segmentation service determines that a generated depth map is less than the threshold quality, the device may be instructed to output, to a user within the environment, a request to recapture an image of the user. For instance, the device may audibly output a request to recapture the image, may send this request to another device (e.g., a phone of the user), or may output this request in any other manner. While a few fallback methods have been described above and are discussed below, it is to be appreciated that other implementations may utilize other similar or different fallback methods.

FIG. 1 illustrates an example architecture 100 in which a user 102 operates a device 104 in the environment of the user to capture one or more images of the user 102 (or other objects of interest). As illustrated, in this example the device 104 includes a first camera 106(1) and a second camera 106(2), although in other instances the device 104 may include any other number of cameras. In one example, the camera 106(1) comprises a depth camera configured to generate one or more depth maps of the user environment using structured light, LIDAR, time-difference-of-arrival techniques, or the like. The camera 106(2), meanwhile, may comprise an RGB camera or the like, configured to capture one or more still images of the environment, video, or the like.

In some instances, the user 102 may operate the device 104 to request that the device 104 capture one or more images of the user 102 for the purpose of providing back to the user 102 what he or she would look like wearing a different piece of apparel, such as a shirt, pants, a hat, or the like. Of course, while FIG. 1 illustrates one example, the techniques described herein may be utilized for other purposes as well. In this example, the camera 106(1) may generate a depth map of the user environment including the user 102 while the camera 106(2) may capture a color image (for example) of the user environment at substantially the same time. The device 104 may then send the depth map and the color image to a segmentation service 108 over a network 110. The network 110 may be representative of any type of communication network, including data and/or voice networks, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. In some instances, the segmentation service 108 is remote from the environment of the user 102, while in other instances it may reside on the device 104 or on another device within the environment of the user 102.

Upon receiving the depth map and the color image, the segmentation service 108 may attempt to segment the color image using the depth map. As illustrated, the segmentation service 108 may be implemented as one or more servers that, in some instances, form a portion of a network-accessible computing platform implemented as a computing infrastructure of processors 112 and storage (e.g., memory 114) that is accessible via the network 110, such as the Internet. The segmentation service 108 may not require end-user knowledge of the physical location and configuration of the system that delivers the services. Common expressions associated for the resources of the image-recognition service 108 may include "on-demand computing", "software as a service (SaaS)", "platform computing", "network-accessible platform", "cloud services", "data centers", and so forth. Further, the memory 114 (and other memory described herein) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 may be implemented as computer-readable storage media ("CRSM"), which may be any available physical media accessible by the processor(s) 112 to execute instructions stored on the memory 904. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 112.

The memory 114 may have access to a datastore storing one or more color images 116 (e.g., received from the device 104 and other devices), a datastore storing one or more depth maps 118 (e.g., received from the device 104 and other devices), a segmentation module 120, and a datastore storing one or more modified images 122 based on the received color images and depth maps, as discussed below. Upon receiving the color image and the depth map from the device 104, the segmentation module 120 may attempt to perform segmentation using the depth map and/or using another acquired depth map. While the segmentation service 108 may store the segmentation module 120 to perform some or all of the segmentation techniques described herein, in some instances some or all of these techniques may be performed at the device 104 and/or at another device. As illustrated, the device 104 also includes one or more network interfaces 124 (e.g., for communicating with the segmentation service 108 and the like), one or more processors 126, and memory 128. As illustrated, the memory 128 may store the segmentation module 120 or some variation thereof.

Regardless of where the segmentation module 120 executes, the segmentation module 120 may first apply one or more noise-reduction algorithms to the depth map or to a portion of the depth map. For instance, the segmentation module 120 may apply linear smoothing filters, non-linear smoothing filters, anisotropic diffusion, non-local means, or other techniques for removing "noise" in the form of missing depth values from the depth map. In some of these instances, the pixels lacking depth values may be treated as speckle noise and, generally, may be assigned depth values based on the depth values of neighboring pixels. Additionally or alternatively, the segmentation module 120 may apply temporal noise-reduction algorithms. For example, envision that the device in the environment of the user 102 periodically, sporadically, or continuously generates depth images of the environment. To assign a pixel value to a pixel lacking a depth value within the depth map, the segmentation service 108 may determine the value of the missing pixel in one or more previous depth maps generated by the camera. That is, in instances where the camera generates depth maps of the environment from a fixed location, a temporal noise-reduction algorithm may determine a depth value for a particular pixel of a depth map based one or more previous depth values of that pixel in previously generated depth maps. In some instances, the device may assign the depth value most recently assigned to that pixel, may apply an average or median depth value assigned to that pixel over a number of previously generated depth maps, or the like. While the above example describes the segmentation service 108 performing the noise reduction, in some instances the device 104 may perform this noise reduction.

After applying one or more noise-reduction algorithms to the depth map, the segmentation module 120 may determine whether the depth map is of sufficient quality for use in segmenting the image. In some instances, the segmentation module 120 may make this determination with reference to an entirety of the depth map, while in other instances it may do so with reference to a particular region-of-interest (ROI). For instance, the segmentation module 120 may initially define an ROI corresponding to some or all of the object of interest and may make the quality determination with respect to this ROI. In one example, the segmentation module 120 may define an ROI that substantially corresponds to a body of the user 102 (e.g., an entirety of the user, a torso of the user, torso/legs/arms of the user, etc.). For instance, the segmentation module 120 may attempt to identify a predefined part of the user and may then define the ROI based on the location of the predefined part. In one example, the segmentation module 120 uses facial-recognition techniques to identify, from the depth map or the color image, a face of a user depicted in the depth map and/or image. Stated another way, the segmentation module may perform computer vision on a color image to identify a face of a user and may set the pixels corresponding to the face of the user in the image as the region of the image corresponding to the predefined part of the user. As is known, this may include locating eyes, a nose, and/or the like. The segmentation module 120 may then define an ROI corresponding to less than all of the depth map and image and having a location that is based on the location of the face of the user. In one example, the ROI comprises a rectangular section of the depth map or image located beneath the location of the face. Of course, in other examples, the segmentation service may define the ROI with reference to any other predefined part of the user 102 (e.g., hands, torso, legs, etc.) and the ROI may have any other form (e.g., oval-shaped, polygonal, custom-shaped, etc.). It is also noted that while the above description describes applying one or more noise-reduction algorithms to the depth map prior to defining the ROI, in other instances these algorithms may additionally or alternatively be applied after defining the ROI.

After defining the ROI, the segmentation module 120 may then determine whether the ROI of the depth map is greater or less than a threshold quality. For instance, the segmentation module 120 may determine an amount of pixels of the ROI that lack depth values and may compare this to a threshold amount. If the number of pixels lacking depth values is greater than the threshold amount, then the segmentation module 120 may store an indication that the depth map is unsuitable for use and may utilize one or more fallback methods for segmentation. If, however, the amount of pixels is not greater than this threshold amount, then the segmentation module 120 may utilize this depth map for segmentation. In some instances, the comparison may be based on a percentage of pixels of the ROI lacking depth values. For instance, the segmentation module 120 may deem a depth map unsuitable for use 30%, or the like of the pixels of the ROI lack depth values.

If the segmentation module 120 determines that the depth map is of sufficient quality, then the module 120 may segment the object of interest, such as the depiction of the user 102, from the received color image. That is, the segmentation module 120 may utilize the depth map to determine the pixels corresponding to the depiction of the user 102 and may assign these pixels a first label, and may determine the remaining pixels of the image and may assign these a second label. Generally, the first label may indicate that the respective pixels assigned this label correspond to the user 102, while the second label may indicate that these respective pixels correspond to the background. After doing so, the segmentation module 120 may perform additional functions on the color image, such as generate a new image based in part on the depiction of the 102 in the color image. In the illustrated example, the segmentation module 120 uses the segmented image and another image of a particular piece of clothing to generate a new image that illustrates how that particular piece of clothing would look if worn by the user 102 in the segmented image. The segmentation service may then provide this to a device for output on a device of the user, such as illustrated client device 130.

As illustrated, the client device 130 may include one or more network interfaces 132, one or more processors 134, and memory 136, which may store a companion application 138. The companion application 138 may receive and present, on a display of the device 130, the new, modified image depicting the user 102 wearing the different piece of apparel.

Figure 2:
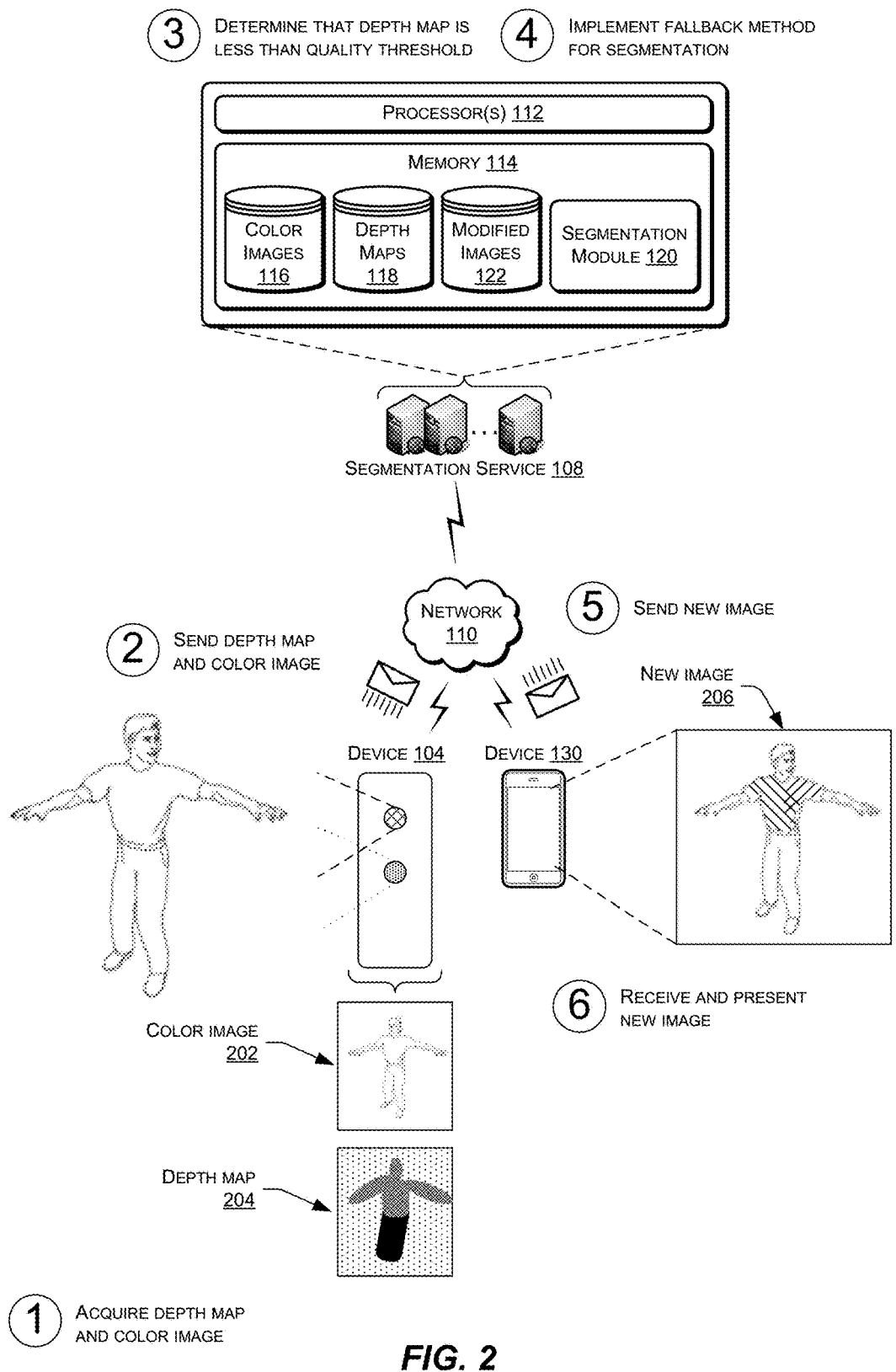
FIG. 2 illustrates example operations within the environment of FIG. 1 for creating a new image, potentially as requested by the user, despite a depth map generated by the device within the user's environment lacking sufficient quality. As illustrated, the segmentation service utilizes a fallback method for segmentation in response to determining that the depth map lacks the sufficient quality.

FIG. 2 illustrates example operations within the architecture 100 of FIG. 1 for creating a new image, potentially as requested by the user 102, despite a depth map generated by the device within the user's environment lacking sufficient quality. As illustrated, the segmentation service 108 utilizes a fallback method for segmentation in response to determining that the depth map lacks the sufficient quality. At "1", the device 104 acquires a color image 202 of the environment of the user 102 and generates a depth map 204 of the environment. As described above, an RGB camera may acquire the color image 202, while a depth camera may generate the depth map 204. At "2", the device 104 sends the color image 202 and the depth map 204 to the segmentation service 108.

At "3", the segmentation service compares the received depth map 204 to a quality threshold and determines that that the depth map 204 is less than this threshold. For instance, the segmentation service 108 may determine that the depth map 204 includes more "holes" than a threshold amount of holes. Therefore, in response, at "4" the segmentation service 108 implements one or more fallback methods for performing segmentation on the color image. In general, these fallback methods include generating a new depth map (e.g., in whole or based on augmenting the existing depth map 204) and performing segmentation on the new depth map. FIGS. 3-9 describe example fallback methods, as discussed below. In addition, in this example the segmentation service 108 generates a new image that is based on the segmenting of the user 102 in the color image 202. In this example, the service identifies the user in the color image 202 based on the segmentation and creates a new image depicting the user 102 wearing a different shirt.

For instance, after generating the new depth map, the segmentation module 120 may perform computer-vision techniques using the depth map and the color image to identify the shirt being worn by the user. In other examples, the segmentation module 120 may perform computer-vision techniques using the depth map and the color image to identify a shirt or other article of clothing on a hanger (e.g., being held by the user 102). After identifying the shirt or other article of clothing, prior to or after or in the alternative to generating a new image, the segmentation service 108 may recommend one or more items to the user 102 based on the identified shirt or article of clothing. For instance, the segmentation service 108 may recommend another similar shirt to the user 102, a pair of pants that may match the shirt, or the like. For instance, the segmentation service 108 may identify other shirts or articles of clothing that people who purchased the illustrated shirt have also frequently purchased. Furthermore, after generating the recommendation, the segmentation service 108 may send this recommendation for output on the client device 130 in some instances. This recommendation may comprise a textual recommendation, a newly generated image showing the user 102 wearing the recommended shirt or other article of clothing, or the like.

In addition to identifying the illustrated shirt (or other item) being worn by the user 102 or on the hanger being held by the user 102, the segmentation service may store, in the memory, 114, an indication of the shirt in association with an account of the user 102. As such, the segmentation service 108 may create a "virtual closet" of items worn by the user or held on hangers by the user 102 in front of the device 104. In addition to storing the items in association with the account of the user, the segmentation service 108 may maintain a history of the items as worn by the user 102. That is, because each item may be associated with a unique identifier in the memory 114, each time the segmentation module 120 identifies a particular item, it may store an indication of the date and/or time that the item was worn using the unique identifier of the item. Therefore, the segmentation service is able to provide information to the user, such as an indication of when the user 102 last wore a particular shirt or other clothing item, other clothing items the user 102 often wears with the shirt, or the like.

In the illustrated example, the segmentation module 120 generates, after segmenting the portion of the color image corresponding to the user wearing the shirt, a new image showing the user wearing another shirt. In another example, the segmentation module 120 may generate a new image showing the shirt currently worn by the user or a recommended shirt "in focus", with a background being shown as blurry, having a uniform color (e.g., white), or the like. Regardless of the particular new image generated by the segmentation module 120, at "5", the segmentation service 108 sends this new image to the device 130 of the user 102. At "6", the device 130 receives and presents the new image.

Figure 3:
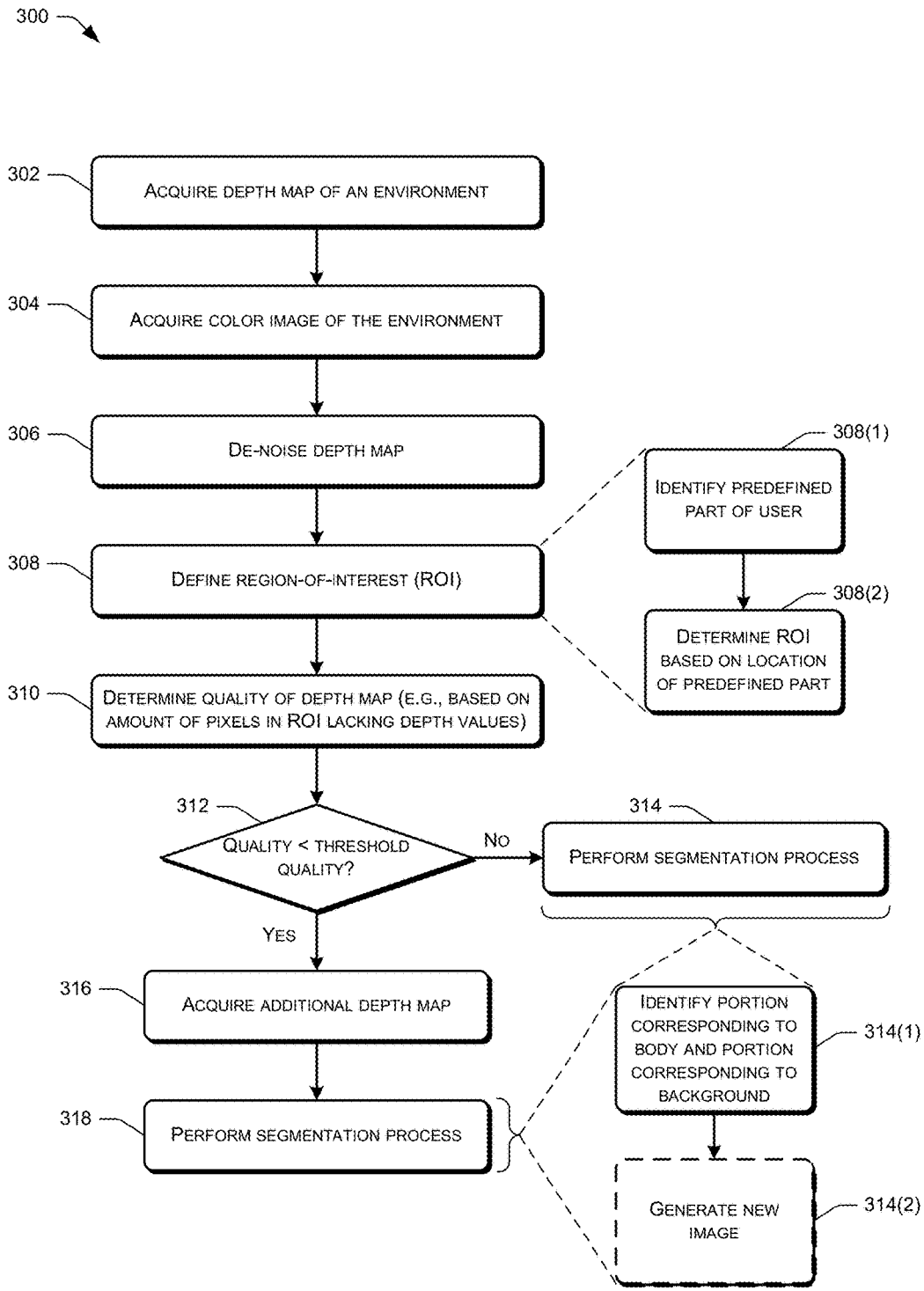
FIG. 3 illustrates a flow diagram of an example process that allows for segmentation of an image regardless of whether a depth map associated with the image is of sufficient quality.

FIG. 3 illustrates a flow diagram of an example process 300 that allows for segmentation of an image regardless of whether a depth map associated with the image is of sufficient quality. In some instances, the segmentation module 120 may perform some or all of the process 300 and the processes discussed with reference to FIGS. 3-9. Further, each process described herein is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 302, the segmentation module 120 acquires depth map data of the environment, with the environment including an object of interest such as a user. At 304, the segmentation module 120 acquires color image data of the environment. In some instances, the color image data and the depth map data are generated at approximately a same time and both include approximately the same field of view of the environment, such that the color image data and the depth map data represent a common scene of the environment in terms of time and space.

At 306, the segmentation module 120 applies one or more noise-reduction algorithms to the depth map to potentially increase a quality of the acquired depth map data. In some instances, this includes applying linear or non-linear algorithms to smooth out the depth map data, and/or applying temporal noise-reduction methods to the depth map data. At 308, the segmentation module 120 defines an ROI of the depth map data, such as a region of the depth map data that substantially corresponds to the user or other object of interest. In one example, the segmentation module 120 identifies a face of the user and then defines a rectangular (or other-shaped) region beneath the face. For instance, the operation 308 may include a sub-operation of identifying a predefined part of the user at 308(1), such as a face, torso, arms, or the like, and then determining, at 308(2), the ROI of the depth map data based on the location of the predefined part in the depth map data. Further, while this example describes defining the ROI with reference to the depth map data, in some instances the segmentation module 120 may define this ROI with reference to the color image.

At 310, the segmentation module 120 then determines a quality of the ROI or the depth map data as a whole and, at 312, determines whether this quality is greater than a quality threshold. If so, then at 314 the segmentation module 120 performs a segmentation process, which includes identifying, at 314(1), a portion of the ROI corresponding to the user or other object of interest and a portion of the ROI corresponding to a background. As described above, each pixel may be assigned one of multiple labels in this regard, such as a first label indicating that a particular pixel is associated with the user or a second label indicating that the particular pixels is associated with the background. Further, in this example, at 314(2) the segmentation module 120 may generate a new image based on the segmenting of the user or other object of interest from the color image.

If, however, the quality of the ROI or depth map data as a whole is determined to be less than the threshold, then at 316 the segmentation module 120 may acquire additional depth map data using one or more fallback approaches. In some instances, acquiring additional depth map data comprises generating new depth map data "from scratch" (i.e., independent of the first depth map data), while in other instances the acquiring the additional depth map data comprises augmenting/modifying the first depth map data to create the additional depth map data. FIGS. 3-9 and corresponding discussion describe some of these fallback approaches in greater detail. Finally, after acquiring the additional depth map data, the segmentation module 120 may perform the segmentation process at 318, using the additional depth map data rather than the depth map data deemed to be unsuitable for use at 312.

Figure 4:
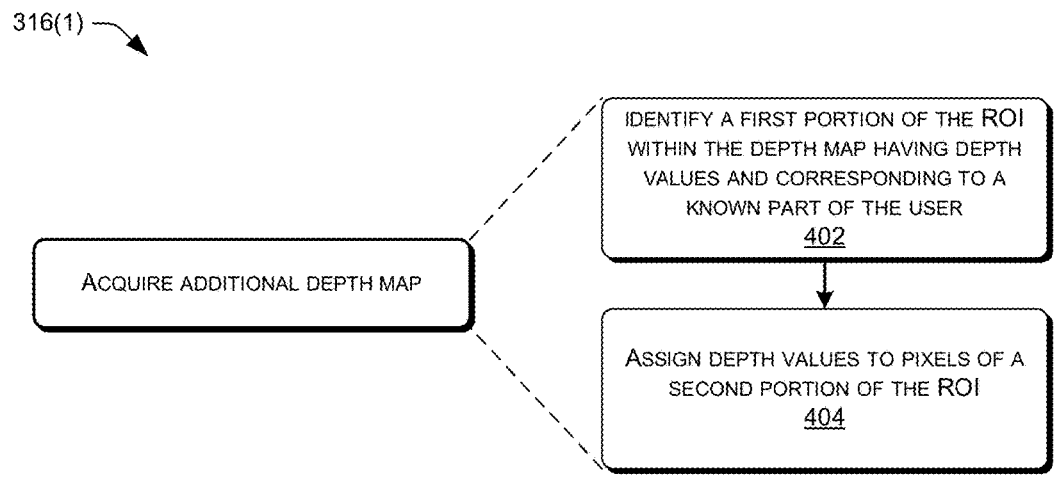
FIG. 4 illustrates one example of acquiring a second depth map in the event that a first depth map of an environment lacks sufficient quality. In this example, the second depth map is generated by identifying a known part of a user from the first depth map and assigning, based on the location of the known part of the user, depth values to pixels that lack depth values in the first depth map.

FIG. 4 illustrates one example of acquiring second depth map data in the event that first depth map data of an environment lacks sufficient quality. In this example, the segmentation module 120 first identifies, at 402, a first portion of the ROI of the depth map data having depth values that correspond to a known part of a user, such as a face, torso, a hand, a leg, or the like. Next, at 404, the segmentation module 120 assigns depth values to pixels of a second portion of the ROI (which initially lack depth values) based on the location of the known part of the user. That is, the segmentation module 120 may be preconfigured with one or more models that indicate a general structure of a human body (or other object of interest), such that the segmentation module 120 may first identify a known body part and, using this information, fill in the holes of the depth map data. For instance, if the segmentation module 120 identifies, from the depth map data, a torso of the user, the segmentation module 120 may use the model to determine that the legs of the user are likely directly beneath the torso. As such, the segmentation module 120 may assign depth values to the pixels beneath the torso based on this assumption. These pixels may be assigned depths that match or are otherwise based on the depth values of the pixels depicting the torso of the user.

Figure 5:
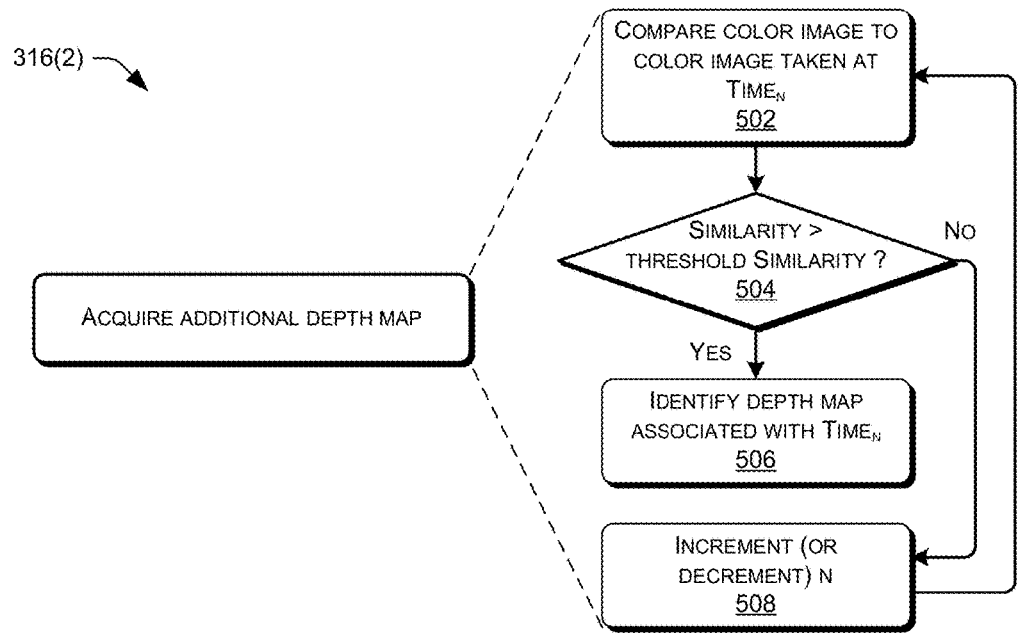
FIG. 5 illustrates another example of acquiring the second depth map in the event that the first depth map of an environment lacks sufficient quality. In this example, the second depth map is generated by identifying a color image that was previously acquired and that is sufficiently similar to the current color image of the environment. The depth map generated at a same time as the previously acquired color image is then used as the second depth map, assuming that this previously generated depth map is of sufficient quality.

FIG. 5 illustrates another example of acquiring the second depth map data in the event that the first depth map of an environment lacks sufficient quality. In this example, the segmentation module 120 first compares, at 502, the current color image to a color image of the environment that was previously acquired. That is, because the device 104 within the environment may generate color image/depth map pairs over time, the current color image corresponding to the unsuitable depth map data may be compared to previously acquired color images of the environment. For instance, the segmentation module 120 may perform block-matching or other computer-vision techniques to calculate a similarity between the current color image and each of multiple previously captured color images. The segmentation module 120 may then identify a color image having a similarity score that is greater than a threshold (and/or has the highest similarity score when compared to the current color image). After doing so, the segmentation module 120 may then acquire the depth map data corresponding to this similar color image and may use this previously generated depth map data in place of the current, unsuitable depth map data. That is, because the color images are deemed sufficiently similar, it may be fair to assume that the depth maps also have sufficient similarity for use.

FIG. 5, for instance, illustrates that after comparing the current color image data to color image data acquired at a time "N", the segmentation module 120 may determine whether the similarity there between is greater than a similarity threshold. In response to identifying a sufficiently similar color image, at 506 the segmentation module 120 may identify the depth map data associated with $Time_N$ and use this previously generated depth map as a replacement for the current, unsuitable depth map data. If, however, the similarity is not greater than the threshold, then at 508 the segmentation module 120 may increment (or decrement) N and compare the current color image to another previously captured color image until a sufficiently similar color image is found (if any).

Figure 6:
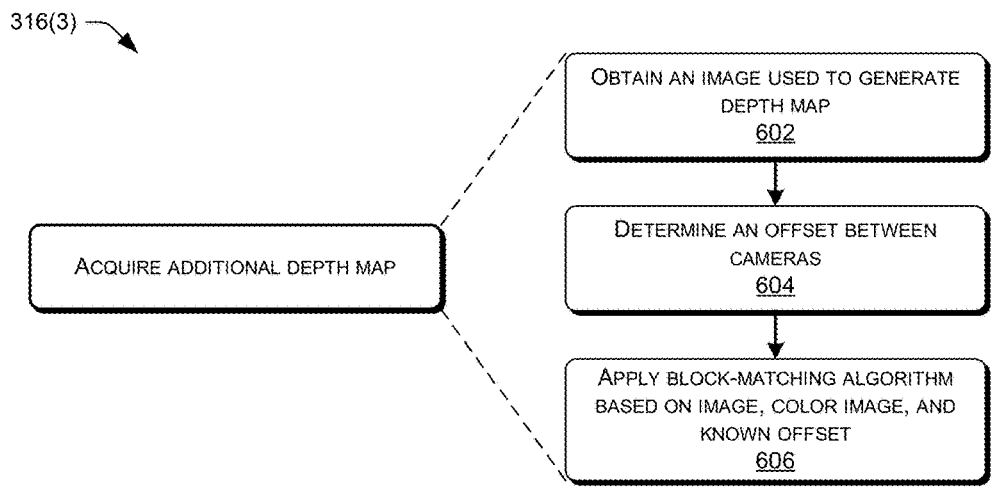
FIG. 6 illustrates another example of acquiring the second depth map in the event that the first depth map of an environment lacks sufficient quality. In this example, the second depth map is generated using stereoscopic vision techniques, made possible by the existence of at least two cameras in the device in the environment of the user.

FIG. 6 illustrates another example of acquiring the second depth map data in the event that the first depth map data of an environment lacks sufficient quality. In this example, at 602 the segmentation module 120 acquires an image used to generate the depth map data. That is, the current depth map data may be generated based on a sequence of images captured as a projector (e.g., an infrared (IR) emitter) of the device 104 projects structured (or coded) light onto objects within the environment of the user 102. The segmentation module 120 may acquire one or these images, and may also determine, at 604, an offset between the camera that generated the depth map data and the camera that acquired the color image data. Thereafter, the segmentation module 120 may apply, at 606 a block-matching algorithm for aligning these two images with one another and, thereafter, for determining the depth of objects within the images using stereoscopic vision techniques. That is, once the images have been aligned, the segmentation module 120 may estimate depths of objects in the images (e.g., the user 102) based on the images having been captured by a stereo pair of cameras at a known offset to one another.

In further detail, the first camera 106(1) may include an infrared (IR) emitter configured to emit IR light (for example) onto the environment in different patterns while the first camera 106(1) captures a series of images of the environment. The first camera 106(1) then generates the first depth map data based on the series of images. In some instances, the IR emitter emits a different pattern during each time interval associated with each image of the series of images, including a pattern of full illumination. That is, the IR emitter may fully illuminate during a particular time period during which the first camera 106(1) captures one image of the series of images. This image, therefore, represents a view of the environment at a time when the IR emitter does not project a pattern that causes certain portions of the environment to be illuminated and other portions not. As such, the image corresponding to this time may be used to compare against the color image data, which also represents a view of the environment free from portions of the environment being specially illuminated and portions not.

Therefore, the segmentation module 120 may select this first image of the series of images captured by the first camera 106(1). After determining the offset between the first and second cameras, the segmentation module 120 may then perform the block-matching at 606. In some instances, the segmentation module 120 identifies, from the first depth map data, those pixels that are not associated with depth values (again, above a minimum confidence level). The segmentation module may then select pixel blocks that include these "holes". For instance, if the segmentation module 120 determines that a pixel in the upper-left portion of the ROI lacks a depth value in the first depth map, the segmentation module 120 may select, for block-matching, a pixel block of the first image of the series of images that is centered around this particular pixel. That is, the pixel block may include the pixel that lacks the depth value as well as one or more neighbors of the pixel (e.g., immediately adjacent neighbors to the pixel). Then, the segmentation module applies the block-matching algorithm to identify a corresponding block of pixels in the color image.

After identifying the corresponding block of pixels in the color image data, the segmentation module 120 may determine a distance between the center pixel of the pixel block in the first image captured by the first camera 106(1) and the center pixel of the matching block in the color image captured by the second camera 106(2). This distance may be measured in pixels of the images or in physical distance within the environment based on analysis of the images. The segmentation module 120 then calculates a depth of this particular pixel based on this distance as well as the known offset between the first camera 106(1) and the second camera 106(2). In some instances, the segmentation module 120 may therefore use these techniques to "fill the holes" in the first depth map data to effectively generate second depth map data. In other instances, meanwhile, the segmentation module 120 may disregard the first depth map data entirely and may generate the second depth map data anew based on the block-matching between the first image of the series of images and the color image.

Figure 7:
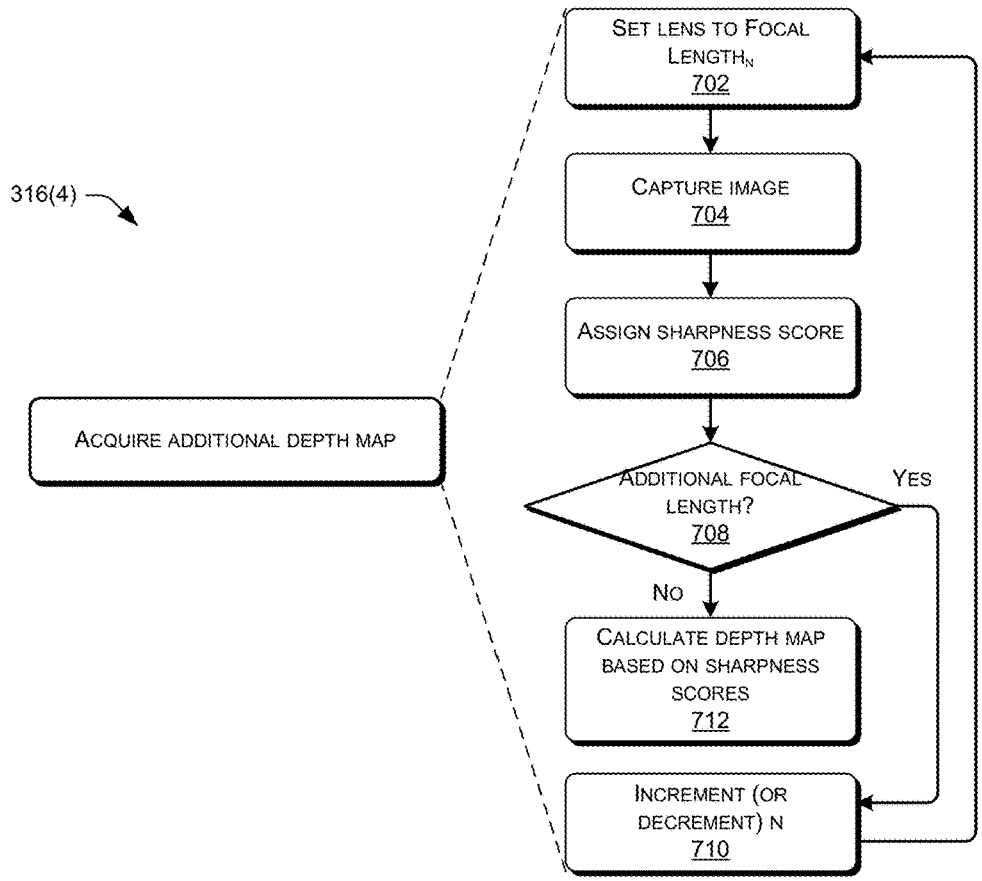
FIG. 7 illustrates another example of acquiring the second depth map in the event that the first depth map of an environment lacks sufficient quality. In this example, the second depth map is generated by performing a "focus sweep" of the environment by capturing individual images when a lens of the camera is at respective focal lengths and assigning sharpness scores to pixels of these images.

FIG. 7 illustrates another example of acquiring the second depth map data in the event that the first depth map data of an environment lacks sufficient quality. In this example, the second depth map data is generated by performing a "focus sweep" of the environment by capturing individual images when a lens of the camera is at respective focal lengths and assigning sharpness scores to pixels of these images. For instance, at 702 the segmentation module 120 sets a focal length of a lens of the camera 106(1) or 106(2) to a focal length "N" and, at 704, instructs the respective camera to capture an image of the environment. At 706, the segmentation module 120 then assigns a respective sharpness score to each pixel of the captured image. That is, each pixel may be analyzed to determine how "sharp" or "blurry" the respective pixel is within the image captured when the lens was at the first focal length.

Next, at 708, the segmentation module 120 determines whether to adjust the focal length of the lens of the camera. That is, the segmentation module 120 may be configured to perform a focus sweep at a predefined number of focal lengths (e.g., three, ten, etc.) and may determine whether it still has images yet to acquire. If so, then at 710 the segmentation module 120 increments (or decrements) "N") and proceeds to change to the focal length of the lens to the new value N, before acquiring an image of the environment at this focal length and assigning sharpness scores to the newly acquired image. After performing this portion of the process the preconfigured number of times, at 712 the segmentation module 120 calculates depth map data of the environment based at least in part on the assigned sharpness scores. In general, when a particular pixel has a highest sharpness score in a particular image, then the object represented by that pixel has a depth corresponding to the focal length at which the particular image was captured. Further, in some instances the segmentation module 120 may interpolate depths for instance, if a sharpness score of a particular pixel is the same at a focal length corresponding to six feet and a focal length corresponding to twelve feet, the segmentation module 120 may set the depth at nine feet (equal to a middle of these depths). In some instances, when a particular pixel location is assigned with a depth value (from the initial depth map or from another fallback method), this pixel location may be ignored during the focus sweep process. That is, the segmentation module 120 may refrain from calculating sharpness scores for pixels already having known depth values.

Figure 8:
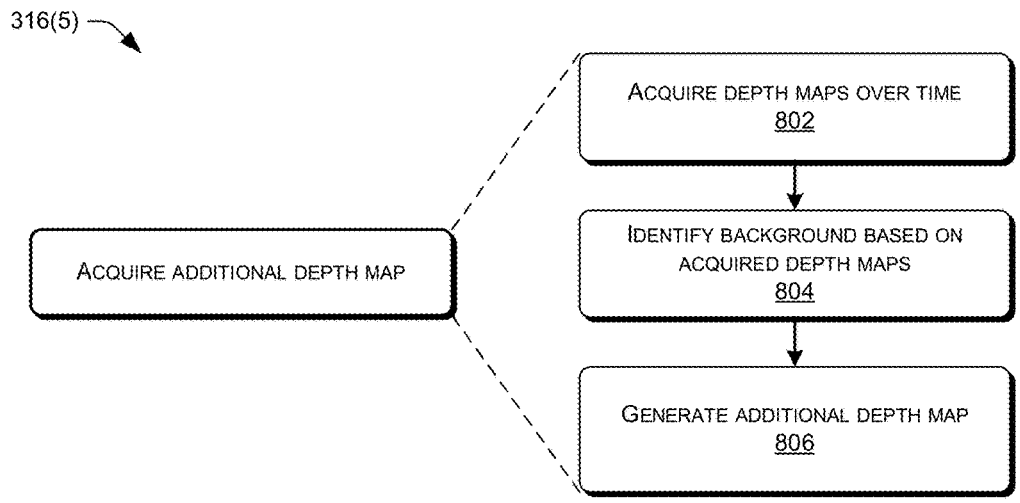
FIG. 8 illustrates another example of acquiring the second depth map in the event that the first depth map of an environment lacks sufficient quality. In this example, a background of an environment is identified based on depth maps being generated over time from a fixed location. Thereafter, when a depth map is generated and an object of interest (e.g., a user) is in the environment, the background may be identified based on the a priori knowledge of the background, thus allowing for segmentation of the object of interest.

FIG. 8 illustrates another example of acquiring the second depth map data in the event that the first depth map data of an environment lacks sufficient quality. In this example, the segmentation module 120 determines a background of the environment of the user 102 over time from a fixed location and uses this information to deduce an object of interest within a new image. For instance, at 802, the segmentation module 120 acquires multiple depth maps (and corresponding color images) over time. At 804, the segmentation module 120 identifies the background of the environment based on analysis of these depth maps acquired over time. That is, the segmentation module 120 may identify those pixels corresponding to relatively fixed (constant) depth values over time. In some instances, the segmentation module 120 may attempt to ensure that a pixels having relatively constant depth values do in fact correspond to a background of the environment by taking into account the color values and/or luminosity of the pixels over time. That is, in order for a pixel to be designated as background, the segmentation module 120 may ensure that both: (1) the depth of the pixel has remain at a relatively fixed depth (within a threshold), and (2) that the color value and/or luminosity of the pixel has remain relatively constant over time (within a threshold). As will be appreciated, for example, if a pixel corresponds to a wall in the environment, the pixel may be associated consistently with a relatively fixed depth value by the fixed depth sensor, and may also be associated with a relatively constant color value and luminosity over time, as determined by the depth maps captured over time.

At 806, the segmentation module 120 then generates the additional depth map data by taking the current, unsuitable depth map and marking the known background pixels as background and a remainder of the pixels as corresponding to the user or other object of interest.

Figure 9:
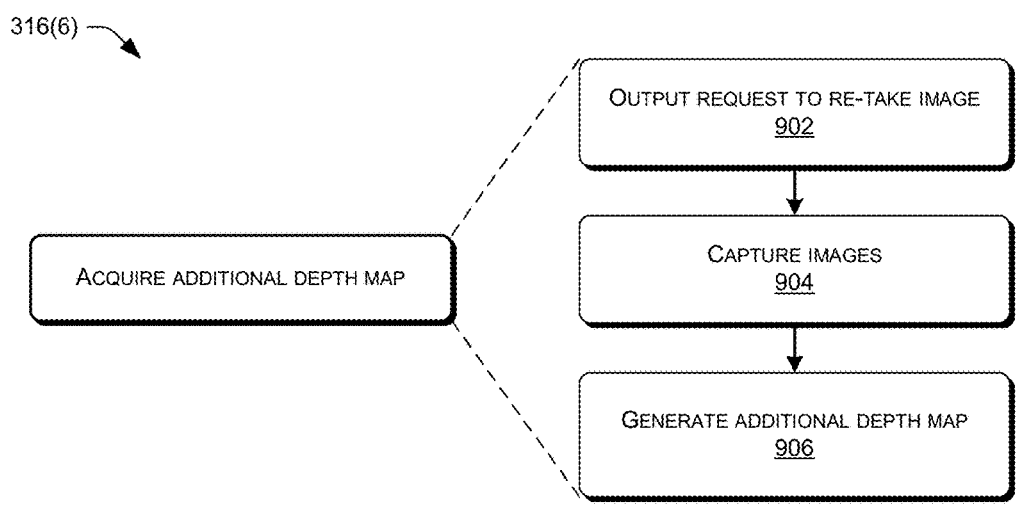
FIG. 9 illustrates another example of acquiring the second depth map in the event that the first depth map of an environment lacks sufficient quality. In this example, the second depth map is generated in response to outputting a request that a user re-capture an image of the user or other object of interest.

FIG. 9 illustrates another example of acquiring the second depth map data in the event that the first depth map data of an environment lacks sufficient quality. In this example, the second depth map data is generated in response to outputting a request that a user re-capture an image of the user or other object of interest. At 902, in response to determining that the current depth map data is unsuitable, the segmentation module 120 instructs the device or other device within the environment of the user 102 to output a request to the user 102 to re-capture an image of the user. That is, the user may be prompted audibly via one or more speakers, visually via a display of the client device 130, or in any other way to retake an image of the user. At 904, the device 104 captures a color image by a first camera and one or more images by a depth camera and, at 906, generates corresponding new depth map data of the environment. The device 104 then provides the color image data and the depth map data to the segmentation module 120 for segmentation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:
1. One or more computing devices comprising:
   a first camera comprising an infrared (IR) emitter, the first camera to capture a series of images of an environment that includes a user wearing a first article of clothing and generate a depth map based at least in part on the series of images, wherein a first image of the series of images is captured at a time that the IR emitter illuminates the environment;

a second camera to capture a color image of the environment, the color image captured substantially contemporaneously with the first image of the series of images;

one or more processors; and one or more non-transitory computer-readable media storing computer-executable instructions that, when executed on the one or more processors, cause the one or more processors to perform acts comprising:

identifying a location of a predefined part of the user in at least one of the depth map or the color image;

defining a region of interest (ROI) within the depth map based at least in part on the location of the predefined part of the user, the ROI substantially corresponding to a body of the user;

determining an amount of pixels of the ROI lacking a depth value in the depth map;

comparing the amount of pixels to a threshold amount;

determining that the amount of pixels is greater than the threshold amount;

performing block-matching on the first image of the series of images and the color image to identify at least one block of pixels of the first image of the series of images that corresponds to at least one block of pixels of the color image;

determining a distance between the at least one block of pixels in the first image of the series of images and the at least one block of pixels of the color image;

calculating at least one depth value associated with a pixel based at least in part on the distance;

generating an additional depth map by combining previous depth values of the depth map with the at least one depth value;

identifying, using the additional depth map, a first portion of the color image substantially corresponding to the body of the user;

identifying a second portion of the color image substantially corresponding a background; and generating a new image, the new image comprising the second portion of the color image corresponding to the background and at least part of the first portion of the color image replaced with an image of the user wearing a second article of clothing that is different than the first article of clothing.

2. The one or more computing devices as recited in claim 1, the acts further comprising:

identifying a location of a pixel that lacks a corresponding depth value in the depth map; and selecting the at least one block of pixels in the first image of the series of images for block-matching, the at least one block of pixels comprising the pixel that lacks the corresponding depth value and pixels that are immediately adjacent to the pixel that lacks the corresponding depth value in the depth map.

3. The one or more computing devices as recited in claim 1, the acts further comprising:

determining a physical offset between the first camera and the second camera;

and wherein the calculating the at least one depth value comprises calculating the at least one depth value of the pixel based at least in part on the distance and the physical offset between the first camera and the second camera.

4. A method comprising:

generating, using a first camera, first depth map data of an environment based at least in part on first image data of the environment captured by the first camera;

acquiring, using a second camera, color image data of the environment;

determining that a quality of the first depth map data is lower than a quality threshold, the quality of the first depth map being based at least in part on an amount of pixels that:

lack a depth value; or have a depth value for which a confidence level is lower than a threshold confidence level;

identifying a first pixel block of the first image data that corresponds to a second pixel block of the color image data;

calculating a depth value associated with a pixel of the first pixel block of the first image data based at least in part on the second pixel block of the color image data; and generating second depth map data based at least in part on the depth value of the pixel.

5. The method as recited in claim 4, wherein the generating the first depth map data comprises generating the first depth map data based at least in part on a series of images of the environment captured by the first camera, and wherein the first image data comprises a first image of the series of images.

6. The method as recited in claim 5, further comprising:

illuminating the environment with different light patterns using a light source during a time that the first camera captures the series of images, each image of the series of images being captured at a time that the light source illuminates the environment in a respective light pattern;

wherein identifying the first pixel block is based at least in part on the first image data being associated with a time during which the light source was fully illuminated.

7. The method as recited in claim 4, further comprising:

determining a region-of-interest (ROI) of the first depth map data, the ROI substantially corresponding to an object of interest;

determining an amount of pixels of the ROI that are associated with depth values for which the confidence level is below the threshold confidence level; and determining that the amount of pixels of the ROI corresponds to a quality that is less than the quality threshold.

8. The method as recited in claim 4, further comprising determining an offset between the first camera and the second camera, and wherein:

the identifying comprises identifying a distance between the first pixel block of the first image data and the second pixel block of the color image data; and the calculating comprises calculating the depth value of the pixel of the first pixel block based at least in part on the offset between the first camera and the second camera and the distance between first pixel block of the first image data and the second pixel block of the color image data.

9. The method as recited in claim 4, wherein the generating the second depth map data comprises generating the second depth map data based at least in part on the depth value of the pixel and the first depth map data.

10. The method as recited in claim 9, further comprising:
identifying a location of a pixel that lacks a corresponding depth value in the first depth map data; and
selecting the first pixel block of the first image data based at least in part on the first pixel block of the first image data corresponding to the location of the pixel that lacks the corresponding depth value in the first depth map data.

11. The method as recited in claim 4, wherein the acquiring the color image data comprises acquiring the color image of the environment, the environment including an object of interest, and further comprising:
identifying, using the second depth map data, a portion of the color image data substantially corresponding to the object of interest; and
segmenting the portion of the color image data substantially corresponding to the object of interest.

12. The method as recited in claim 4, further comprising, prior to the determining that the quality of the first depth map data is lower than the quality threshold:
determining that a first pixel in the first depth map data is not associated with a depth value;
determining that the first pixel is associated with a particular depth value in previous depth map data generated prior to the first depth map data; and
assigning a new particular depth value to the first pixel in the first depth map data, the new particular depth value based at least in part on the particular depth value.

13. One or more computing devices comprising:
one or more processors; and
one or more non-transitory computer-readable media storing computer-executable instructions that, when executed on the one or more processors, cause the one or more processors to perform acts comprising:
generating, using a first camera, first depth map data of an environment based at least in part on first image data of the environment captured by the first camera;
acquiring, using a second camera, color image data of the environment;
determining that a quality of a region of interest (ROI) of the first depth map data is lower than a quality threshold, the quality being based at least in part on an amount of pixels within the ROI lacking a depth value;
identifying a first pixel block of the first image data that corresponds to a second pixel block of the color image data, wherein the first pixel block is within the ROI;
calculating a depth value of a pixel of the first pixel block; and
generating second depth map data based at least in part on the depth value of the pixel.

14. The one or more computing devices as recited in claim 13, the acts further comprising:
illuminating the environment with different light patterns using a light source during a time that the first camera captures a series of images, including the first image data, for generating the first depth map data, each image of the series of images being captured at a time that the light source illuminates the environment in a respective light pattern;
wherein the identifying the first pixel block is based at least in part on the first image data being associated with a time during which the light source was fully illuminated.

15. The one or more computing devices as recited in claim 13, the acts further comprising:
determining an amount of pixels of the ROI that are associated with depth values for which the confidence level is below a threshold confidence level; and
determining that the amount of pixels of the ROI corresponds to a quality that is less than the quality threshold.

16. The one or more computing devices as recited in claim 13, the acts further comprising determining an offset between the first camera and the second camera, and wherein:
the identifying comprises-identifying a distance between the first pixel block of the first image data and the second pixel block of the color image data; and
the calculating comprises calculating the depth value of the pixel of the first pixel block based at least in part on the offset between the first camera and the second camera and the distance between first pixel block of the first image data and the second pixel block of the color image data.

17. The one or more computing devices as recited in claim 13, wherein the generating the second depth map data comprises generating the second depth map data based at least in part on the depth value of the pixel and the first depth map data.

18. The one or more computing devices as recited in claim 17, the acts further comprising:
identifying a location of a pixel that lacks a corresponding depth value in the first depth map data; and
selecting the first pixel block of the first image based at least in part on the first pixel block of the first image data corresponding to the location of the pixel that lacks the corresponding depth value in the first depth map data.

19. The one or more computing devices as recited in claim 13, wherein the acquiring the color image data comprises acquiring the color image data of the environment, the environment including an object of interest, and the acts further comprising:
identifying, using the second depth map data, a portion of the color image data substantially corresponding to the object of interest; and
segmenting the portion of the color image data substantially corresponding to the object of interest.

20. The one or more computing devices as recited in claim 13, the acts further comprising, prior to the determining that the quality of the first depth map data is lower than the quality threshold:
determining that a first pixel in the first depth map data is not associated with a depth value;
determining that the first pixel is associated with a particular depth value in previous depth map data generated prior to the first depth map data; and
assigning a new particular depth value to the first pixel in the first depth map data, the new particular depth value based at least in part on the particular depth value.

* * * * *